May 28, 1957 B. L. MIMS 2,793,525
BEARING SMOOTHNESS SELECTOR
Filed Oct. 20, 1953
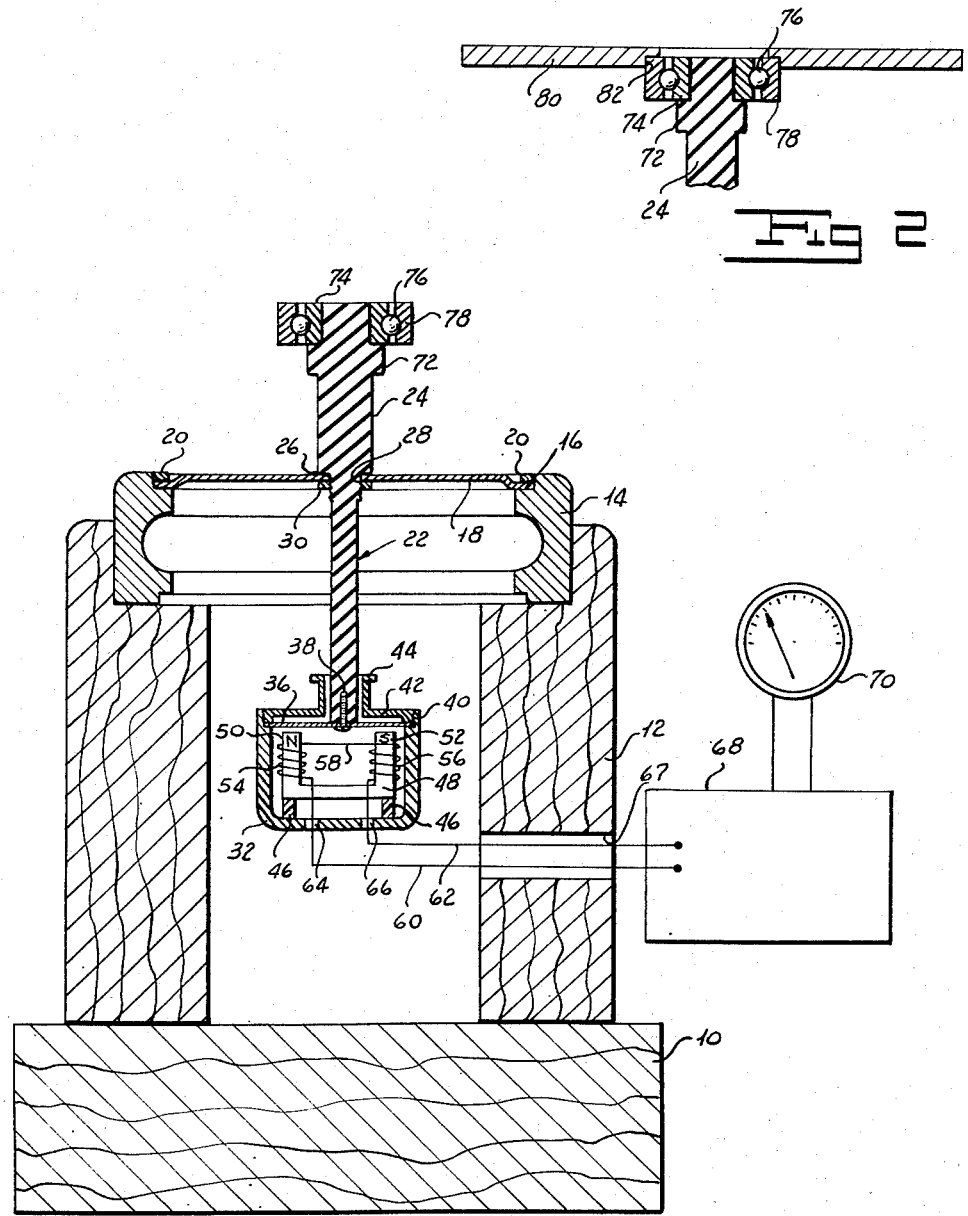
INVENTOR.
BRUCE L. MIMS
BY
ATTORNEY United States Patent Office 2,793,525
Patented May 28, 1957

2,793,525

BEARING SMOOTHNESS SELECTOR

Bruce L. Mims, Danbury, Conn., assignor to The Barden Corporation, Danbury, Conn., a corporation of Connecticut Application October 20, 1953, Serial No. 387,278

2 Claims. (Cl. 73—67)

My invention relates to a bearing smoothness selector and more particularly to an instrument for determining the over-all operating smoothness of a ball bearing assembly.

Dirt, such as minute metallic fragments of burrs and scale or nonmetallic foreign particles from various sources, may lodge in the races of a ball bearing and cause it to be rough running so as to be unsatisfactory for its intended use. This problem is of particular importance where precision bearings are involved, since lint of the order of 0.001 is a very large dirt particle in a precision bearing. Surface finish and surface defects of balls and races also contribute to operating roughness, which must be controlled. It is, therefore, desirable that some test be made in the course of manufacture of bearings whereby bearings which do not conform to an arbitrary high acceptance standard may be rejected before they are put in use. In the course of manufacture, bearings may be tested in a dry or unoiled condition. However, since it may be desirable to test the smoothness of a bearing which has been in use, some means should be provided for testing bearings in the oiled condition.

Some means must, therefore, be provided for determining the smoothness of a bearing. One such method employed in the prior art is mounting the bearing on a brass or fiber wand by its inner race and then spinning its outer race. This is generally done without oil in the bearing, since it will spin for a greater length of time when dry. The tester holds the wand by its end removed from the bearing and feels any vibration caused by dirt or the like in the bearing. From experience obtained in prior tests, he then judges whether or not the bearing is sufficiently clean for its intended use. It will readily be appreciated that this test has all the disadvantages of any subjective test, since it depends for its accuracy on the skill and experience of the operator.

Another means used to determine bearing smoothness is a noise testing device, which includes a driven spindle for rotating the inner race of the bearing being tested, and a suitable form of transducer, which bears against the outer race and reproduces any vibration caused by dirt in the bearing. It is obvious that in such a device the outer race must be held and some thrust applied thereto while the inner race is rotated by the spindle. This testing device suffers from a number of disadvantages which are particularly apparent when small bearings are being tested. For example, the vibration reproduced by the transducer includes not only vibration from the test bearing but also any vibration in the driving means and spindle. For small bearings the vibration of the driving means and spindle may be greater than that of the bearing being tested so that the test fails completely. In addition, the means for holding the outer race serves to damp some of the vibration of the bearing being tested. That is, the bearing is loaded and positively driven.

I have invented a bearing smoothness selector which automatically performs the operation of testing bearing smoothness and which does not depend for its accuracy on the skill and experience of the tester. Moreover, in my tester the only moving parts are the outer race, retainer, and balls of the bearing under test and no driving means is employed which might add to the bearing vibration. The bearing being tested is suspended in my testing device so that the damping effects due to loading are minimized.

One object of my invention is to provide a bearing smoothness selector for testing the smoothness of ball bearings with a high degree of accuracy.

Another objects of my invention is to provide a bearing smoothness selector which does not depend for its accuracy on the skill and experience of the tester.

A further object of my invention is to provide a bearing smoothness selector in which damping of the vibrations of the bearing being tested is a minimum.

A still further object of my invention is to provide a bearing smoothness selector in which loading of the bearing being tested is very small.

Other and further objects of my invention will appear from the following description.

In general, my invention contemplates the provision of a wand supported at a point along its length by a flexible diaphragm mounted for vibratory movement on a suitable stand or support. One end of the wand is formed with means for supporting the bearing being tested and a flexible ferrous diaphragm is secured to the other end of the wand for movement therewith. The ferrous diaphragm carries a housing containing a permanent magnet having a pair of pole pieces. As the bearing spins, any vibration therein causes a corresponding vibration in the wand which is transmitted to the ferrous diaphragm, causing the latter to vibrate with respect to the housing and the permanent magnet contained therein. The vibration of the ferrous diaphragm with respect to the permanent magnet causes a corresponding change in the magnetic path of the flux flowing between the pole pieces. In order to sense this change in magnetic path, I arrange a pair of windings about the respective pole pieces and connect them in series aiding relationship. As the flux flowing between the pole pieces changes due to the change in its magnetic path resulting from the vibration of the wand, a voltage is induced in the windings which is proportional to the vibration. This voltage is fed to a suitably calibrated indicating device and provides a measure of the smoothness of the bearing. The indicating device may be set up to indicate whether or not the bearing is within arbitrary acceptance standards. If a bearing is to be tested in the oiled condition, a light disk is mounted on the outer race and spins therewith during the test to ensure that the bearing spins for a long enough time for the operator to obtain a reading.

In the accompanying drawings which form part of the instant specification and which are to be read in conjunction therewith and in which like reference numerals are used to indicate like parts in the various views:

Figure 1 is a sectional view of my bearing smoothness selector showing the arrangement of parts.

Figure 2 is a fragmentary sectional view of my bearing smoothness selector when an oiled bearing is being tested.

More particularly referring now to the drawings, I provide a base 10 carrying a standard 12 on which I mount a ring support 14, formed with an annular threaded recess 16 near the top thereof in which I dispose a flexible diaphragm 18. Diaphragm 18 is retained within recess 16 by a ring 20 threaded into the recess 16 of the ring support.

A wand, indicated generally by reference character 22, has an enlarged portion 24 forming an annular shoulder 26 along the length of wand 22. Shoulder 26 mounts wand 22 in a central hole 28 in diaphragm 18. Wand 22 is formed of fiber or brass or any other appropriate material. It is to be noted that the portion of wand 22 immediately below shoulder 26 is threaded, and I provide a retaining ring 30 threaded on this portion for holding the wand 22 to the diaphragm 18. Alternatively, diaphragm 18 can be welded to the shoulder 26 of wand 22.

The lower end of wand 22 as viewed in Figure 1 extends into a housing 32. A second diaphragm 36 is fixed on the end of wand 22 by any convenient means such as a screw 38 or a spot weld or solder joint, and is mounted within a threaded recess 40 formed at the top of housing 32 and retained therein by a cover plate 42 threaded into the recess 40. Cover plate 42 is formed with a passageway 44 at its center through which wand 22 extends. It will be appreciated that passageway 44 forms a guide for wand 22 and that housing 32 is carried by diaphragm 36.

Within housing 32 on brackets 46 I support a U-shaped magnet 48 having legs 50 and 52. A first winding 54 is disposed about leg 50 and a second winding 56 about leg 52. A conductor 58 connects these windings in series aiding relationship.

Diaphragm 36 is formed of ferrous material and so tends to concentrate lines of force passing between legs or pole pieces 50 and 52 of magnet 48. Housing 32 and cover plate 42 are formed of any appropriate nonmagnetic material such as brass or the like. As diaphragm 36 moves toward or away from pole pieces 50 and 52, the magnetic path of the flux passing between the pole pieces varies, and as a result, the flux varies. This changing flux induces voltages in windings 54 and 56 which are proportional to the vibration of diaphragm 36. Since I connect windings 54 and 56 in series aiding relationship, the resultant output signal will be the sum of the voltages induced in the coils.

A pair of conductors 60 and 62 pass through openings 64 and 66 in the base of housing 32 and through a bore 67 in standard 12 to feed this output signal to an amplifier 68. The amplifier 68 is selected to have a flat overall frequency response when in combination with the electromagnetic pickup such, for example, as over the range of one cycle to one thousand cycles, so that the resultant indication will be independent of the speed of the bearing. It will be appreciated that neither the electromagnetic pickup alone nor the amplifier 68 alone has the flat frequency response. Amplifier 68 is so selected that its response which is not flat compensates for the electromagnetic pickup's response which also is not flat to provide a flat over-all frequency response. Amplifier 68 actuates a suitable indicating device 70, having a dial provided with a suitable reference mark to indicate when a particular bearing has a vibration which exceeds the amount of vibration in a selected standard. While I have shown a meter 70, any type indicating device such as a buzzer, light, or other means could be employed and actuated when the bearing vibration exceeds an arbitrary acceptance standard.

It is to be understood also that while I have shown an electromagnetic induction vibration responsive means, any means responsive to vibration could be employed to feed amplifier 68. It is to be emphasized that my instrument is not intended to function as a vibration meter which measures the magnitude of vibration present in a bearing. It merely detects the presence of a vibration in a bearing which is above a critical acceptance standard of vibration. Conveniently I employ a flexible diaphragm 18 to afford a proper support for the bearing being tested. That is, my arrangement supports the bearing so that it may be spun and any vibration therein will not be damped out by the supporting means. In addition, this support does not load the bearing and does not introduce extraneous vibrations from a drive means.

The enlarged portion 24 of wand 22 extends above diaphragm 18 and is formed with an annular boss 72 on which the inner race 74 of a bearing to be tested is supported. It will be appreciated that I may provide wand 22 with a removable top portion including boss 72 so that interchangeable parts may be provided to accommodate bearings of various sizes. The bearing to be tested also includes balls 76 and an outer race 78. Since the test is generally performed with a dry bearing, the outer race may be spun directly and the bearing will rotate long enough for a suitable indication to be obtained.

When it is desired to test the smoothness of a bearing in oiled condition, some means must be provided for maintaining the rotation of the bearing sufficiently long to obtain an indication. Referring now to Figure 2, when the bearing to be tested is in the oiled condition, I place a light disk 80 over the outer race 78 of the bearing. Disk 80 is provided with a centrally located annular recess 82 by means of which it is carried by the outer race 78. It will be appreciated that this disk is selected to have a low mass so that it applies a minimum load to the bearing and a sufficiently high polar moment of inertia to keep the bearing rotating long enough to obtain a reading.

In use, the bearing to be tested is placed by its inner race 74 on the enlarged portion 24 of wand 22 so that it is supported by boss 72. If the bearing is to be tested in a dry condition, the arrangement illustrated in Figure 1 is employed. The outer race 78 of the bearing is spun manually by a rapid flick of the finger or by any appropriate means causing the outer race to spin by inertia. If lint or metallic fragments are in the bearing, it will not be smooth running but will have a certain amount of vibration. This vibration causes a resultant vibration of the wand 22 which is supported by the flexible diaphragm 18. This vibration of wand 22 along its axis displaces the ferrous diaphragm 36 of the vibration-responsive means. As the diaphragm 36 vibrates in response to the vibration of wand 22, the magnetic path of the flux flowing between end poles 50 and 52 of magnet 48 is varied. As a result of this changing magnetic path, the flux between end poles 50 and 52 changes and induces a corresponding voltage in windings 54 and 56 disposed on the respective end poles 50 and 52. I have connected windings 54 and 56 in series aiding relationship by conductor 58 so that the over-all output signal from the pole windings is the sum of their individual induced voltages. This output signal is fed to the amplifier 68 by leads 60 and 62. The amplified output signal from amplifier 68 actuates the indicating device 70 which is set up to an arbitrary acceptance standard and indicates, either by means of a scale, flashing light, buzzer, or the like, that a bearing is not acceptable. If there is an excessive amount of dirt in the bearing so that it does not run smoothly enough to conform to the accepted standard, the device 70 will be actuated to indicate that this bearing should be rejected. In the event the bearing is sufficiently smooth, the vibration of ferrous disk 36 will not be sufficient to produce an output signal from windings 54 and 56 which actuates the device 70 or an output signal of sufficient magnitude.

If I desire to test a bearing in the oiled condition, it is necessary to provide some means for maintaining the rotation of the outer race 78 of the bearing for a sufficient time to obtain an indication on meter 70. To ensure such rotation, I place the disk 80 over the outer race and spin the disk. As mentioned hereinbefore, this disk is selected to have a low mass so that the loading of the bearing will be a minimum, and it is selected to have a large polar moment of inertia so that the bearing rotation will be maintained long enough to obtain a reading. When disk 80 is not employed, the bearing is not loaded at all so that the damping of vibrations resulting from dirt in the bearing is a minimum. When disk 80 is employed, some small damping is necessarily present. This damping, however, is a minimum because of the low mass of the disk. That is, the loading for the oiled conditions is mass of the outer race plus the disk 80, while the load for the unoiled condition is the weight of the outer race only.

Thus it will be seen that I have accomplished the objects of my invention. I have provided a ball bearing smoothness selector which is adapted to determine automatically when a bearing being tested is without the limits of an arbitrary acceptance standard. My bearing smoothness selector does not depend for its accuracy on the skill and experience of the operator, since the reading is substantially independent of the rapidity of the spin. In addition, it employs no independent drive means which might set up extraneous vibrations which affect the accuracy of the test. Bearings are tested in my device in a substantially unloaded condition so that damping of vibrations caused by dirt in the bearings is a minimum. I have also provided means for testing bearings in either the oiled or unoiled condition.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A ball bearing smoothness selector for determining the smoothness of a ball bearing assembly having a pair of races including in combination a flexible diaphragm, means mounting said flexible diaphragm for vibratory movement, a wand suspended from said diaphragm, one end of said wand supporting one race of the bearing being tested, a flexible diaphragm of magnetic material, means for securing said magnetic material diaphragm to the other end of said wand, a housing, an electromagnetic induction device mounted within said housing adjacent said magnetic diaphragm, and means for suspending said housing from said magnetic diaphragm to permit relative movement between said diaphragm and said induction device, said electromagnetic induction device producing a signal having a magnitude proportional to the displacement of said magnetic diaphragm with respect to said device.

2. A ball bearing smoothness selector as in claim 1 in which said induction device includes a magnet having a pair of poles and respective windings carried by said poles, said windings being connected in series aiding relationship, said magnetic diaphragm providing a part of the flux path for said magnet, the reluctance of the flux path varying with displacement of said magnetic diaphragm to change the flux linking said windings.

References Cited in the file of this patent

UNITED STATES PATENTS

| | | |
|---|---|---|
| 216,228 | Seymour | June 3, 1879 |
| 1,746,171 | Vatinet et al. | Feb. 4, 1930 |
| 1,992,453 | Vincent | Feb. 26, 1935 |
| 2,364,229 | McCormack | Dec. 5, 1944 |